(12) United States Patent
Wang et al.

(10) Patent No.: US 10,948,750 B2
(45) Date of Patent: Mar. 16, 2021

(54) ANTI-PEEPING DEVICE, ANTI-PEEPING DISPLAY AND CONTROL METHOD

(71) Applicants: BEIJING BOE DISPLAY TECHNOLOGY CO., LTD., Beijing (CN); BOE TECHNOLOGY GROUP CO., LTD., Beijing (CN)

(72) Inventors: Yupeng Wang, Beijing (CN); Jianjun Wang, Beijing (CN); Lidong Yan, Beijing (CN); Jiliang Zhang, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 12 days.

(21) Appl. No.: 16/338,000

(22) PCT Filed: Aug. 24, 2018

(86) PCT No.: PCT/CN2018/102171
§ 371 (c)(1),
(2) Date: Mar. 29, 2019

(87) PCT Pub. No.: WO2019/080627
PCT Pub. Date: May 2, 2019

(65) Prior Publication Data
US 2019/0271866 A1  Sep. 5, 2019

(51) Int. Cl.
*G02F 1/13* (2006.01)
*G02F 1/1335* (2006.01)
*G02F 1/13357* (2006.01)

(52) U.S. Cl.
CPC ...... *G02F 1/1323* (2013.01); *G02F 1/133553* (2013.01); *G02F 1/1336* (2013.01);
(Continued)

(58) Field of Classification Search
CPC ............ G02F 1/1323; G02F 2201/307; G02F 2201/30; G02F 1/133553; H04N 2013/40; G02B 17/006; G02B 2207/123
See application file for complete search history.

(56) References Cited

U.S. PATENT DOCUMENTS

| 2016/0275875 A1* | 9/2016 | Wei ...................... G02F 1/1347 |
| 2018/0231811 A1 | 8/2018 | Wu |
| 2019/0271866 A1 | 9/2019 | Wang et al. |

FOREIGN PATENT DOCUMENTS

| CN | 2781414 Y | 5/2006 |
| CN | 105867007 A | 8/2016 |

(Continued)

OTHER PUBLICATIONS

First Office Action for Chinese Patent Application No. 201710993518.3 dated Apr. 22, 2019. X.

(Continued)

*Primary Examiner* — Jessica M Merlin
(74) *Attorney, Agent, or Firm* — Calfee, Halter & Griswold LLP

(57) ABSTRACT

An anti-peeping device, an anti-peeping display, and a control method. The anti-peeping device comprises an external light source, a grating mirror structure, and a first controller coupled to the grating mirror structure. The external light source is configured to emit light towards the grating mirror structure, and the first controller is configured to control the grating mirror structure to rotate such that light emitted from the external light source towards the grating mirror structure is reflected to a first direction by the grating mirror structure, the first direction deviating from a normal perpendicular to the horizontal plane of the grating mirror structure.

17 Claims, 3 Drawing Sheets

(52) U.S. Cl.
CPC ............ *G02F 2001/133562* (2013.01); *G02F 2201/30* (2013.01); *G02F 2201/307* (2013.01)

(56) References Cited

FOREIGN PATENT DOCUMENTS

| | | |
|---|---|---|
| CN | 107703654 A | 2/2018 |
| JP | 2003131202 A | 5/2003 |
| JP | 2006235288 A | 9/2006 |

OTHER PUBLICATIONS

Search Report and Written Opinion for International Application No. PCT/CN2018/102171 dated Dec. 28, 2018.

\* cited by examiner

ANTI-PEEPING DEVICE, ANTI-PEEPING DISPLAY AND CONTROL METHOD

CROSS REFERENCE TO RELATED APPLICATIONS

The present application is the U.S. national phase entry of PCT/CN2018/102171, with an international filling date of Aug. 24, 2018, which claims the priority benefits of the patent application No. 201710993518.3 filed to the Chinese Patent Office on Oct. 23, 2017, the disclosure of which is incorporated herein by reference.

TECHNICAL FIELD

This disclosure relates to the field of displays, and specifically to an anti-peeping device, an anti-peeping display and a control method.

BACKGROUND

With the continuous development of display technologies, intelligent display screens are being applied in various aspects of our daily life, for example, touch screen mobile phones, touch screen televisions, ATMs (Automatic Teller Machine) and so on. The intelligent display screens have brought various conveniences to users. For example, the users are allowed to perform related operations on their own initiatives; for another example, the displays are made thinner and lighter and thus more beautiful, e.g., touch screen cell phones and tablet computers.

Currently, although the display technologies have been relatively mature, the users' requirements for displays are higher and higher. For instance, in some cases, when a user is performing related operations on a display or the display is displaying certain content, he/she may not want other users to see what is displayed. As an example, when the user is entering a password on an ATM, as the password relates to the user's property security, he/she may not want it to be seen by other users.

SUMMARY

Exemplary embodiments provide an anti-peeping device, comprising: an external light source, a grating mirror structure, and a first controller coupled to the grating mirror structure. The external light source is configured to emit light towards the grating mirror structure, and the first controller is configured to control the grating mirror structure to rotate such that light emitted from the external light source towards the grating mirror structure is reflected to a first direction by the grating mirror structure, the first direction deviating from a normal perpendicular to a horizontal plane of the grating mirror structure.

In some exemplary embodiments, a side of the grating mirror structure close to the external light source is a light reflective surface.

Another exemplary embodiment provides an anti-peeping display, comprising a display panel for displaying images, and the anti-peeping device according to any of the above embodiments. The grating mirror structure is attached to the display panel and covers at least part of a light exit surface of the display panel, and the external light source of the anti-peeping device is independent of the display panel, and an angle between a line connecting the external light source with the display panel and a normal perpendicular to the light exit surface is not greater than 90 degrees, and an orthogonal projection of the external light source on a plane of the light exit surface does not overlap the light exit surface.

In some exemplary embodiments, the display panel is a liquid crystal display panel, the anti-peeping display further comprises a protective glass layer outside a polarizing plate of the liquid crystal display panel, the grating mirror structure is between the polarizing plate and the protective glass layer.

In some exemplary embodiments, the anti-peeping display comprises two external light sources and two grating mirror structures, the two grating mirror structures cover two opposite side portions of the light exit surface of the display panel respectively, instead of a central portion of the light exit surface of the display panel. The two external light source are oriented to emit light towards the two grating mirror structures respectively.

In some exemplary embodiments, the two grating mirror structures occupy a quarter to a half of a light emitting area of the light exit surface of the anti-peeping display.

In some exemplary embodiments, a width of each grating mirror structure is a quarter to a half of that of a light emitting region of the anti-peeping display.

In some exemplary embodiments, the external light source is configured such that a ratio of brightness of light emitted from the polarizing plate to brightness of the external light source is smaller than a threshold.

Further exemplary embodiments provide an anti-peeping device, comprising a grating mirror structure and a second controller coupled to the grating mirror structure. The grating mirror structure is configured to be in a closed state under control of the second controller if anti-peeping is activated, so as to prevent light emitted from beneath the grating mirror structure from being emitted out from the grating mirror structure.

Yet another exemplary embodiment provides an anti-peeping display, comprising a display panel for displaying images, and the anti-peeping device according to the immediately previous embodiment, the grating mirror structure is attached to the display panel and covers at least part of a light exit surface of the display panel.

In some exemplary embodiments, the display panel comprises a liquid crystal layer, a backlight, and at least two light-transmissive layers above the liquid crystal layer and facing away from the backlight, the grating mirror structure of the anti-peeping device is arranged between any two of the at least two light-transmissive layers.

In some exemplary embodiments, a side of the grating mirror structure is a frosted surface.

In some exemplary embodiments, the anti-peeping display comprises two grating mirror structures, and the two grating mirror structures cover two opposite side portions of the light exit surface of the display panel respectively, instead of a central portion of the light exit surface of the display panel.

In some exemplary embodiments, the backlight is configured to enhance its brightness with an increase of a dimensional proportion of the grating mirror structure in a closed state to a light-emitting area of the light exit surface of the display panel.

A further exemplary embodiment of this disclosure provides a control method based on the anti-peeping device or the anti-peeping display as mentioned in the above embodiments, comprising controlling by the first controller the grating mirror structure of the anti-peeping device to rotate such that light emitted from the external light source towards the grating mirror structure is reflected to the first direction by the grating mirror structure, the first direction deviating from the normal perpendicular to the horizontal plane of the grating mirror structure.

Alternatively, the control method can be based on an anti-peeping device or an anti-peeping display having different structures, then the control method comprising: controlling by the second controller the grating mirror structure in the anti-peeping device to be in a closed state so as to prevent light emitted from beneath the grating mirror structure from being emitted out from the grating mirror structure.

Furthermore, in some exemplary embodiments, the control method further comprises increasing brightness of the display panel according to a dimensional proportion of the grating mirror structure in a closed state to a light-emitting area of the light exit surface of the display panel.

Additional aspects and advantages of this disclosure will be set forth in the following description, and they will be made obvious through the following depictions or be appreciated through implementing the solutions provided in this disclosure.

BRIEF DESCRIPTION OF DRAWINGS

The above and/or additional aspects and advantages of this disclosure will become obvious and clear through depictions of the embodiments with reference to the drawings, in which.

DETAILED DESCRIPTION OF EMBODIMENTS

Figure 1:
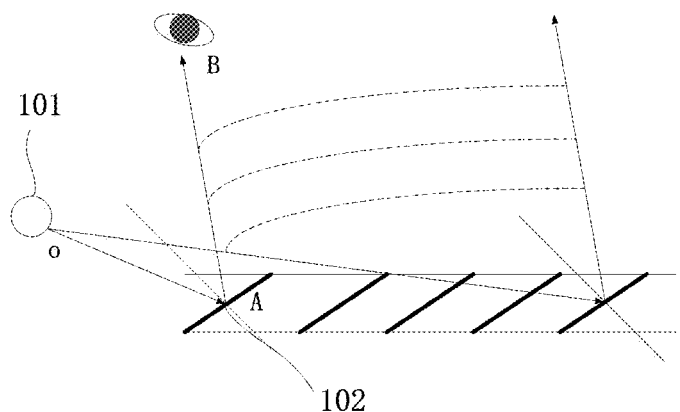
FIG. 1 is a schematic structure view of an anti-peeping device provided in an exemplary embodiment.

Exemplary embodiments will be described in detail. Examples of the embodiments will be shown in the drawings, where same or similar reference signs indicate same or similar elements or elements having same or similar functions throughout the description. The embodiments described below with reference to the drawings are exemplary, and they are only intended to explain the disclosure, instead of limiting the protection scope of the application.

Those skilled in the art can understand that, technical features defined by wordings such as "a", "one", "said" and "the" do not exclude the presence of a plurality of such technical features unless otherwise stated. It should be further understood that the wording "comprise" used in the description of this disclosure means that the subject preceding the wording has a feature, number, step, operation, element and/or component listed after the wording, but does not exclude the presence or adding one or more other features, numbers, steps, operations, elements, components and/or a combination thereof. It should be understood that, when it is stated an element is "connected" or "coupled" to another element, it is possible they are connected or coupled to each other directly, but a presence of an intermediate element is also possible. Besides, the wording "connect" or "couple" used herein comprises wireless connection or wireless coupling. The wording "and/or" used herein comprises one or more items listed, or all of these items, or any combination of any of these items.

Those skilled in the art should understand that, unless otherwise defined, all terms used herein (including both technical terms and scientific terms) have the same meanings as the general understandings of one having ordinary skills in the art of the invention. It should be further understood that terms such as those defined in a general dictionary should be understood as having meanings consistent with the context and should not be construed by ideal or excessively formal meanings, unless specifically stated herein.

In order to achieve the anti-peeping function of a display device, an anti-peeping display film can be attached to the surface of the display. However, the manufacture of the anti-peeping display film requires relatively higher costs which will rise as the display area of the display device increases. Moreover, attaching such an anti-peeping display film on the display will influence the normal display effect of the display device to some degree.

The technical solutions of the exemplary embodiments of this disclosure will be specifically illustrated with reference to the drawings.

FIG. 1 shows a schematic structure view of an anti-peeping device according to an exemplary embodiment. The anti-peeping device specifically comprises an external light source 101 and a grating mirror structure 102, and a first controller (not shown) coupled to the grating mirror structure 102. The external light source 101 is configured to emit light towards the grating mirror structure, and the first controller is configured to control the grating mirror structure 102 to rotate such that light emitted from the external light source towards the grating mirror structure is reflected to a first direction by the grating mirror structure, the first direction deviating from a normal perpendicular to the horizontal plane of the grating mirror structure.

With reference to the examples of FIG. 1, the normal direction of the horizontal plane in which the grating mirror structure is located is namely the vertical direction of FIG. 1, so the first direction deviates from the vertical direction, and it also usually points to the position of a peeper because the peeper is generally located beside a normal user. Accordingly, light emitted from the external light source 101 towards the grating mirror structure 102 can be reflected to the peeper by the grating mirror structure (e.g., FIG. 1 schematically shows an eye B of the peeper).

In the exemplary embodiments of this disclosure, the grating mirror structure refers to an optical structure comprising a plurality of optical elements having reflective characteristics and spaced from each other, the optical elements having gaps therebetween. FIG. 1 schematically shows several optical elements by bold solid lines. It can be understood that the optical elements comprise but are not limited to flat mirrors.

In some exemplary embodiments, the first controller comprises a control circuit, a motor and a support structure for supporting the grating mirror structure, the motor being coupled to the support structure. The motor can rotate under the control of a signal sent from the control circuit and thereby deflect the grating mirror structure via the support structure. In this way, the first controller can control the rotation direction and amplitude of the grating mirror structure, thereby controlling the direction in which light is reflected by the grating mirror structure. When light is reflected towards the eyes of the peeper, the visual effect of the peeper will be affected or disturbed, and thus the effect of anti-peeping is achieved.

In some exemplary embodiments, a side of the grating mirror structure 102 close to the external light source 101 is a light reflective surface.

The anti-peeping principle of the anti-peeping device in the exemplary embodiment can also be illustrated with reference to FIG. 1. As shown in FIG. 1, the grating mirror structure 102 can be first controlled via the first controller such that the light reflective surface thereof faces the external light source, and when light emitted from the external light source 101 is incident on the grating mirror structure 102, the grating mirror structure 102 reflects the light out and the reflected light enters the peeper's eyes. When the brightness of the light entering the peeper's eyes reaches a preset value, the peeper will be unable to see clearly the content displayed on the display applying the anti-peeping device, and thereby the anti-peeping effect is achieved.

Based on the same inventive concept, a further exemplary embodiment provides an anti-peeping display, the anti-peeping display specifically comprising a display panel for displaying images and the anti-peeping device as mentioned in the above embodiment. The grating mirror structure is attached to the display panel and covers at least part of a light exit surface of the display panel, and the external light source of the anti-peeping device is independent of the display panel and located above the light exit surface of the display panel. It should be understood that according to exemplary embodiments, the display panel comprises but is not limited to a liquid crystal display panel and an OLED display panel.

Figure 2:
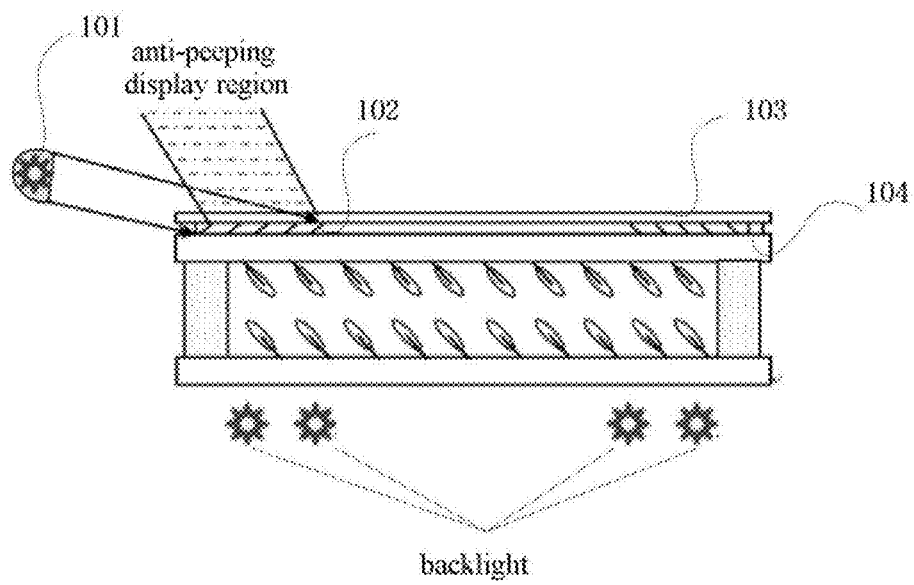
FIG. 2 is a schematic structure view of an anti-peeping display provided in an exemplary embodiment.

In some exemplary embodiments, as shown in FIG. 2, the anti-peeping display is a liquid crystal display, the liquid crystal display comprises a backlight, a liquid crystal layer and a polarizing plate 104. In the exemplary embodiment, the anti-peeping display further comprises a protective glass layer 103, the grating mirror structure 102 being arranged between the polarizing plate 104 and the protective glass layer 103. The external light source 101 is independent of the liquid crystal display panel, and the position of the external light source is not lower than the light exit surface of the display panel.

In some exemplary embodiments, a side of the grating mirror structure 102 facing away from the backlight is a mirror surface capable of reflecting light, and the other side facing the backlight is a frosted surface. The arrangement of the grating mirror structure is not limited to the example as shown in FIG. 2. The grating mirror structure can be arranged in any suitable position of the liquid crystal display panel as long as there is no light-shielding layer in the optical path from the grating mirror structure to the light exit surface of the anti-peeping display.

Figure 3:
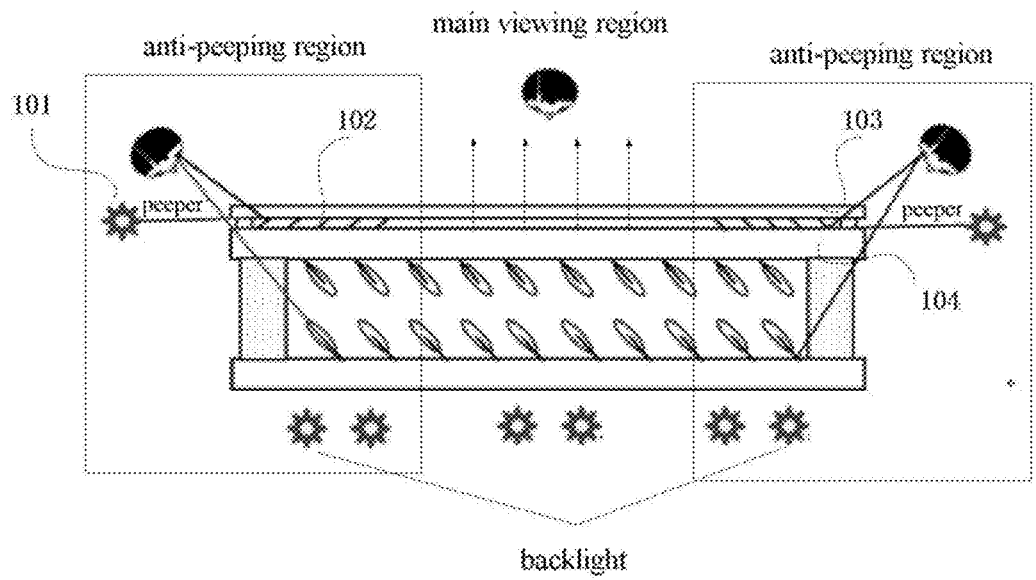
FIG. 3 is a schematic structure view of an anti-peeping display provided in another exemplary embodiment.

According to another exemplary embodiment, as shown in FIG. 3, the anti-peeping display comprises two external light sources 101 and two grating mirror structures 102, and the two grating mirror structures 102 cover two opposite side portions of the light exit surface of the display panel respectively (e.g., the left side and the right side as shown in FIG. 3), but do not cover a central portion of the light exit surface of the display panel. The two external light sources 101 are arranged on the upper left and the upper right of the light exit surface of the display panel respectively. Similar to the exemplary embodiment of FIG. 2, the grating mirror structure 102 can be arranged below the protective glass layer 103.

In the exemplary embodiment of FIG. 3, except for the central portion of the polarizing plate of the liquid crystal display panel, both the left side and the right side of the polarizing plate of the liquid crystal display panel are provided with grating mirror structures, and external light sources are provided above the two grating mirror structures. Similar to the anti-peeping principle of the anti-peeping device in the exemplary embodiment of FIG. 2, with the first controller, the grating mirror structures located on the left side and the right side of the light exit surface of the display can be kept in a suitable deflection state so as to reflect light from the two external light source respectively, such that the reflected light reaches the eyes of the peeper, thereby achieving the anti-peeping effect. At that time, an anti-peeping region is formed on both the left side and the right side of the display, so peepers on both the left side and the right side of the display are unable to see clearly the content displayed on the display, which further enhances the anti-peeping effect. Besides, it can be seen from the examples of FIG. 2 and FIG. 3 that, the external light source of the anti-peeping device 101 is independent of the display panel, and an angle between a line connecting the external light source 101 with the display panel and a normal to the light exit surface of the display is not greater than 90 degrees, and an orthogonal projection of the external light source on the plane of the light exit surface does not overlap the light exit surface.

In some exemplary embodiments, the two grating mirror structures occupy a quarter to a half of a light emitting area of the light exit surface of the anti-peeping display. For example, a width of each grating mirror structure is a quarter to a half of a width of a light emitting region of the light exit surface of the anti-peeping display. In the exemplary embodiments, "width" refers to the dimension of the grating mirror structure or the light emitting region of the light exit surface of the anti-peeping display in a same direction after the grating mirror structure is mounted on the display. For example, in the example of FIG. 3, width refers to the dimension of the grating mirror structure or the light emitting region of the light exit surface of the anti-peeping display in the horizontal direction.

In actual applications, the proportion of the grating mirror structure to the light emitting area of the light exit surface of the display can be arranged upon actual needs. By adjusting the proportion of the grating mirror structure to the light emitting area of the light exit surface of the anti-peeping display, different levels of anti-peeping effect can be achieved on both side of the anti-peeping display; meanwhile, since no anti-peeping component (e.g., the grating mirror structure) is arranged in the central region (the main viewing region) of the light exit surface of the anti-peeping display, the anti-peeping display provided in the exemplary embodiment of this display will not affect the viewing effect of the user (as shown in FIG. 3) while having an anti-peeping effect.

A conventional approach to achieve anti-peeping is to attach an anti-peeping display film to the display, where the anti-peeping display film is attached to the entire display panel. Although this approach also achieves the anti-peeping effect, the viewing effect of the user concerning the main viewing region will be affected due to the interference of the anti-peeping display film. The anti-peeping display in exemplary embodiments can effectively alleviate or avoid this problem.

In a further exemplary embodiment, the brightness of the external light source can be adjusted such that a ratio of the brightness of light emitted from the display panel (e.g. from the polarizing plate of the liquid crystal display panel) to the brightness of the external light source is smaller than a preset value, and thus a contrast of a region of the display involving an anti-peeping range is smaller than a level identifiable for the human eyes, thereby ensuring that the peeper cannot see clearly the content displayed in the display region involving the anti-peeping range.

It is advantageous to the anti-peeping effect that the ratio of the light emission brightness (e.g., the brightness of the light emitted from the polarizing plate) of the display panel in the display to the brightness of the light reflected by the grating mirror structure is smaller than a threshold. For the embodiment as shown in FIG. 2 or FIG. 3, the grating mirror structure is located between the outermost layer (e.g., the protective glass layer) and the secondary outer layer (e.g., polarizing plate) of the display, i.e., light emitted from the external light source only needs to pass through the protective glass layer to meet the grating mirror structure and be reflected thereon, so the brightness of the external light source can be considered herein as similar to that of light reflected by the grating mirror structure.

For example, in actual applications, the brightness of a backlight in a liquid crystal display is usually 3000~8500 nit, and the display has a transmittance of 3%~7%, so the panel brightness (i.e., the panel brightness perceived by the human eyes) of the display is about 250 nit. In this case, if the brightness of the external light source is about 25 nit, human will be unable to see the content on the display, and the ratio of the brightness of the display panel to the brightness of the external light source is 10 in this example. Therefore, in some exemplary embodiments, the above threshold can be set to be 10, and the anti-peeping effect can be facilitated if the brightness of the external light source is adjusted such that the ratio of the brightness of the display panel of the display to the brightness of the external light source is smaller than 10.

For the anti-peeping display provided in the exemplary embodiments, in case it is a liquid crystal display, apart from between the protective glass layer and the polarizing plate, the grating mirror structure can be arranged between a transparent electrode layer and a color filter film, or between a color filter film and a polarizing plate, and so on, which is not limited to the exemplary embodiments of this disclosure.

To sum up, in the anti-peeping device and the anti-peeping display provided in the above exemplary embodiments, an external light source and a grating mirror structure are provided. The grating mirror structure can be controlled in a deflection reflective state via a first controller such that the grating mirror structure reflects light of the external light source, with a reflective angle covering a desired anti-peeping viewing angle (as shown in FIG. 1 or FIG. 2). In actual applications, when the peeper watches the display in a region covered by the anti-peeping viewing angle, light of the external light source reflected by the grating mirror structure will reach the peeper's eyes such that the peeper will be unable to see clearly the content displayed on the display, i.e., the anti-peeping effect is achieved.

Figure 4:
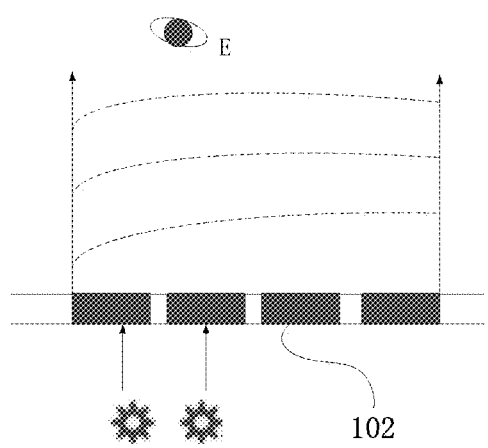
FIG. 4 is a schematic structure view of an anti-peeping device provided in another exemplary embodiment.

FIG. 4 schematically shows the structure of an anti-peeping device according to another exemplary embodiment. As shown in FIG. 4, the anti-peeping device comprises a grating mirror structure 102 and a second controller (not shown) coupled to the grating mirror structure. The grating mirror structure is configured to rotate under the control of the second controller so as to prevent light emitted from beneath the grating mirror structure 102 from being emitted out of the grating mirror structure, thereby preventing light emitted from beneath the grating mirror structure 102 from arriving at the peeper. In this exemplary embodiment, the grating mirror structure refers to a grating structure comprising a plurality of non-transmissive elements spaced from each other, the non-transmissive elements having gaps therebetween. FIG. 4 schematically shows some non-transmissive elements 102. Examples of the non-transmissive element include but are not limited to non-transmissive plastic articles, metals and so on. In another exemplary embodiment, the grating mirror structure can be the same as that described in the preceding exemplary embodiments.

In some exemplary embodiments, the second controller comprises a control circuit, a motor and a support structure for supporting the grating mirror structure, the motor being coupled to the support structure. The motor can rotate under the effect of a signal sent by the control circuit and thereby deflect the grating mirror structure via the support structure. In this way, the second controller can control the orientation of the grating mirror structure e.g. to get it in a horizontal state or a vertical state. When the non-transmissive elements in the grating mirror structure are in a horizontal state (which can also be called a closed state), the grating mirror structure would at least partly prevent light emitted from beneath the grating mirror structure from arriving at the peeper's eyes (e.g., as indicated by E in FIG. 4). When the anti-peeping device is applied to a display device, it can prevent the peeper from clearly seeing information of the region covered by the grating mirror structure, and thus achieving the goal of anti-peeping.

Based on the same inventive concept, a further exemplary embodiment provides an anti-peeping display, which specifically comprises a display panel for displaying images and the anti-peeping device as mentioned in the above embodiments, the grating mirror structure being attached to the display panel and covering at least part of the light exit surface of the display panel.

The display panel comprises but is not limited to a liquid crystal display panel, an OLED display panel and so on. In an exemplary embodiment, the display panel comprises a liquid crystal layer, a backlight, and at least two light-transmissive layers above the liquid crystal layer and facing away from the backlight, and the grating mirror structure of the anti-peeping device is arranged between any two light-transmissive layers. In some exemplary embodiments, the two light-transmissive layers comprise a polarizing plate and a protective glass layer. In some exemplary embodiments, the grating mirror structure is one with a frosted surface.

Figure 5:
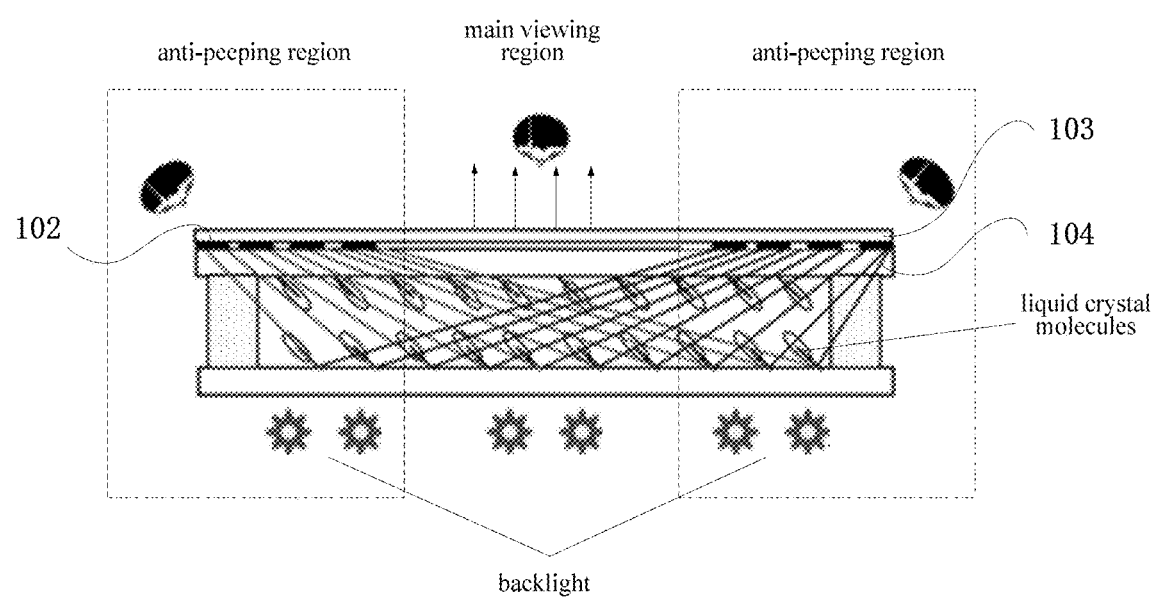
FIG. 5 is a schematic structure view of an anti-peeping display provided in another exemplary embodiment.

In some exemplary embodiments, as shown in FIG. 5, the liquid crystal display panel comprises a protective glass layer 103 serving as the outermost layer, a polarizing plate 104 serving as the secondary outer layer, and the grating mirror structure 102 is arranged between the polarizing plate 104 and the protective glass layer 103. In this embodiment, a side of the grating mirror structure 102 facing away from the backlight is a mirror surface capable of reflecting light, and the other side facing the backlight is a frosted surface.

As shown in FIG. 5, the anti-peeping display provided in an exemplary embodiment comprises two grating mirror structures 102. The two grating mirror structures 102 occupy the left side and the right side of the light exit surface of the display panel, instead of the central portion thereof. The second controller can control each reflective mirror in the two grating mirror structures 102 in a horizontal state (in this case, the grating mirror structure can be considered as in a closed state), so as to shield or prevent light emitted from the liquid crystal layer from arriving at potential peepers located at both sides of the display such that the peepers cannot see clearly the content displayed on the display panel, thereby achieving the anti-peeping effect.

In a case where the display panel of the anti-peeping display comprises a backlight, the backlight can be configured to enhance its brightness with an increase of a dimensional proportion of the grating mirror structure in a closed state to the display area of the anti-peeping display. Specifically, for the anti-peeping display provided in the exemplary embodiment as shown in FIG. 5, since the grating mirror structure is in a closed state when anti-peeping is activated, the grating mirror structure in a closed state not only shields light of the anti-peeping display region, but also may reduce the brightness in the main viewing region of the display, which affects the viewing effect of the user watching the main viewing region. Therefore, increasing the brightness of the backlight according to the dimensional proportion of the grating mirror structure to the display area of the anti-peeping display can compensate the brightness loss of the main viewing region due to the shielding of the grating mirror structure. Specifically, the brightness of the backlight is increased such that the proportion of the brightness of the light emitted from the polarizing plate of the display panel to the brightness of the external ambiance light is greater than or equal to a preset value. In some exemplary embodiments, the backlight is adjusted such that the proportion of the brightness of the light emitted from the polarizing plate to the brightness of the external ambiance light is greater than or equal to 10, so as to ensure the normal viewing of the user watching the main viewing region of the display.

Based on the same inventive concept, a further exemplary embodiment provides a method for controlling the anti-peeping device and the anti-peeping display provided in the above embodiments, thereby achieving the anti-peeping effect. The method comprises controlling by the first controller the grating mirror structure in the anti-peeping device to rotate such that light emitted from the external light source towards the grating mirror structure is reflected to a first direction by the grating mirror structure, the first direction deviating from a normal perpendicular to the horizontal plane of the grating mirror structure. The method provided in this exemplary embodiment is based on the anti-peeping device and the anti-peeping display corresponding to the exemplary embodiments as shown in FIGS. 1-3. The anti-peeping principle is the same as that of the anti-peeping device or the anti-peeping display provided in the above exemplary embodiments, which will not be repeated herein for simplicity.

In particular, by adjusting the deflection angle of the grating mirror structure in the anti-peeping device, with the cooperation with the external light source, the grating mirror structure can be controlled in a reflective state (i.e. reflecting light from the external light source). Meanwhile, by adjusting the deflection angle of the grating mirror structure, the anti-peeping region for the display can be adjusted.

In actual applications, through adjustment of the deflection angle of the grating mirror structure, an anti-peeping angle of 0~90 degrees can be realized, without affecting the viewing effect of the user in the main viewing region. A further exemplary embodiment provide another control method, which is based on the anti-peeping device or the anti-peeping display as shown in FIG. 4 or FIG. 5, thereby achieving the anti-peeping effect. The control method specifically comprises controlling by the second controller the grating mirror structure in the anti-peeping device to be in a closed state so as to prevent light emitted from beneath the grating mirror structure from being emitted out from the grating mirror structure. In particular, in this exemplary embodiment, the deflection angle of the grating mirror structure in the anti-peeping device is adjusted such that the grating mirror structure is parallel with the light-transmissive layer in the display (i.e., the grating mirror structure is in a closed state).

In some exemplary embodiments, the control method further comprises increasing the brightness of the display panel according to a dimensional proportion of the grating mirror structure in a closed state to a light-emitting area of the light exit surface of the display panel.

It can be appreciated that, for the anti-peeping display in the exemplary embodiments of FIG. 2 or FIG. 3, through adjustment of the deflection angle of the grating mirror structure, the grating mirror structure can not only be controlled in a deflection reflective state, but also in a closed state, so the anti-peeping display in the exemplary embodiments of FIG. 2 or FIG. 3 may operate in two anti-peeping modes.

What have been described above are only some exemplary embodiments, and it should be pointed out that, for one having ordinary skills in the art, different variations and modifications can also be made without deviating from the principles of this disclosure, and such variations and modifications should also be deemed as falling within the scope of this application.

The invention claimed is:

1. An anti-peeping device comprising: an light source, a grating mirror structure, and a first controller coupled to the grating mirror structure,
   wherein the light source is configured to emit light towards the grating mirror structure, and the first controller is configured to control the grating mirror structure to rotate, so that the grating mirror structure reflects the light emitted from the light source towards the grating mirror structure to a first direction, the first direction deviating from a normal perpendicular to a horizontal plane of the grating mirror structure.

2. The anti-peeping device according to claim 1, wherein a side of the grating mirror structure close to the light source is a light reflective surface.

3. An anti-peeping display, comprising:
   a display panel for displaying images, and
   the anti-peeping device according to claim 1,
   wherein the grating mirror structure is attached to the display panel and covers at least part of a light exit surface of the display panel, and the light source of the anti-peeping device is independent of the display panel, and an angle between a line connecting the light source with the display panel and a normal perpendicular to the light exit surface is not greater than 90 degrees, and an orthogonal projection of the light source on a plane of the light exit surface does not overlap the light exit surface.

4. The anti-peeping display according to claim 3, wherein the display panel is a liquid crystal display panel, wherein the anti-peeping display further comprises a protective glass layer outside a polarizing plate of the liquid crystal display panel, the grating mirror structure is between the polarizing plate and the protective glass layer.

5. The anti-peeping display according to claim 4, wherein the light source is configured such that a ratio of brightness of light emitted from the polarizing plate to brightness of the light source is smaller than a threshold.

6. The anti-peeping display according to claim 3, wherein the anti-peeping display comprises two light sources and two grating mirror structures,
   wherein the two grating mirror structures cover two opposite side portions of the light exit surface of the display panel respectively, instead of a central portion of the light exit surface of the display panel,
   wherein the two light source are oriented to emit light towards the two grating mirror structures respectively.

7. The anti-peeping display according to claim 6, wherein the two grating mirror structures occupy a quarter to a half of a light emitting area of the light exit surface of the anti-peeping display.

8. The anti-peeping display according to claim 7, wherein a width of each grating mirror structure is a quarter to a half of that of a light emitting region of the anti-peeping display.

9. A control method based on the anti-peeping display according to claim 3, comprising:
controlling, by the first controller, the grating mirror structure of the anti-peeping device to rotate such that light emitted from the light source towards the grating mirror structure is reflected to the first direction by the grating mirror structure, the first direction deviating from the normal perpendicular to the horizontal plane of the grating mirror structure.

10. An anti-peeping device, comprising a grating mirror structure and a second controller coupled to the grating mirror structure,
wherein the grating mirror structure is configured to be in a closed state under control of the second controller in response to anti-peeping being activated for the anti-peeping device, so as to prevent light emitted from beneath the grating mirror structure from being emitted out from the grating mirror structure,
wherein the grating mirror structure comprises a plurality of non-transmissive elements spaced from each other, and the plurality of non-transmissive elements are controlled by the second controller to be in a horizontal state to achieve the closed state of the grating mirror structure.

11. An anti-peeping display, comprising:
a display panel for displaying images, and
the anti-peeping device according to claim 10,
wherein the grating mirror structure is attached to the display panel and covers at least part of a light exit surface of the display panel.

12. The anti-peeping display according to claim 11, wherein the display panel comprises a liquid crystal layer, a backlight, and at least two light-transmissive layers above the liquid crystal layer and facing away from the backlight, wherein the grating mirror structure of the anti-peeping device is arranged between any two of the at least two light-transmissive layers.

13. The anti-peeping display according to claim 12, wherein the anti-peeping display comprises two grating mirror structures, and the two grating mirror structures cover two opposite side portions of the light exit surface of the display panel respectively, instead of a central portion of the light exit surface of the display panel.

14. The anti-peeping display according to claim 11, wherein a side of the grating mirror structure is a frosted surface.

15. The anti-peeping display according to claim 14, wherein the backlight is configured to enhance its brightness with an increase of a dimensional proportion of the grating mirror structure in a closed state to a light-emitting area of the light exit surface of the display panel.

16. A control method based on the anti-peeping display according to claim 11, comprising:
controlling, by the second controller, the grating mirror structure of the anti-peeping device to be in a closed state so as to prevent light emitted from beneath the grating mirror structure from being emitted out from the grating mirror structure.

17. The control method according to claim 16, further comprising:
increasing brightness of the display panel according to a dimensional proportion of the grating mirror structure in a closed state to a light-emitting area of the light exit surface of the display panel.

\* \* \* \* \*